United States Patent [19]

Tsuruda et al.

[11] Patent Number: 5,098,007

[45] Date of Patent: Mar. 24, 1992

[54] METHOD OF MANUFACTURING A VEHICLE BODY

[75] Inventors: Hitoshi Tsuruda; Morishige Hattori; Masato Okazaki; Hiroyuki Yamada; Kiyotaka Kikumoto; Takeyuki Watanabe, all of Kudamatsu; Ryoichi Takayama, Kumage; Sumio Okuno, Kudamatsu, all of Japan

[73] Assignee: Hitachi, Ltd., Tokyo, Japan

[21] Appl. No.: 462,770

[22] Filed: Jan. 10, 1990

[30] Foreign Application Priority Data

Jan. 18, 1989 [JP] Japan ................................ 1-7805

[51] Int. Cl.⁵ ............................................. B61D 17/04
[52] U.S. Cl. .................................. 228/125; 228/184; 228/216
[58] Field of Search ..................... 105/396, 397, 400; 228/182, 184, 166, 162, 170, 216, 125, 4.1

[56] References Cited

U.S. PATENT DOCUMENTS

| | | | |
|---|---|---|---|
| 2,458,686 | 1/1949 | Davie | 428/602 X |
| 3,217,132 | 11/1985 | Schillinger | 228/216 X |
| 3,436,521 | 4/1969 | Corrigan et al. | 228/125 X |
| 3,603,498 | 9/1971 | Cook | 228/4.1 |
| 4,182,951 | 1/1980 | Kuder | 228/216 |
| 4,353,313 | 10/1982 | Panagin | 105/397 |

FOREIGN PATENT DOCUMENTS

| | | | |
|---|---|---|---|
| 345962 | 12/1989 | Japan | 105/396 |
| 345963 | 12/1989 | Japan | 105/396 |

Primary Examiner—Kenneth J. Ramsey
Attorney, Agent, or Firm—Antonelli, Terry Stout & Kraus

[57] ABSTRACT

A method of manufacturing a portion of a vehicle body, with the portion being at least part of one of a side, an end, a roof, and a floor plate of the body. The method comprises the steps of providing extruded metal plates formed of a light alloy metal with each of the plates having welding edges and integral structural ribs extending parallel to the welding edges on the inner face of the plates, arranging the plates on a jig in position for welding of the welding edges, without an overlap of the welding edges, restraining the plates in a welding position on the jig, and welding the welding edges on the jig by one-sided welding from an inner side of the plates to produce continuous welds. Frame members extending transversely to the structural ribs can be welded on the same side without moving the plate from the jig.

12 Claims, 4 Drawing Sheets

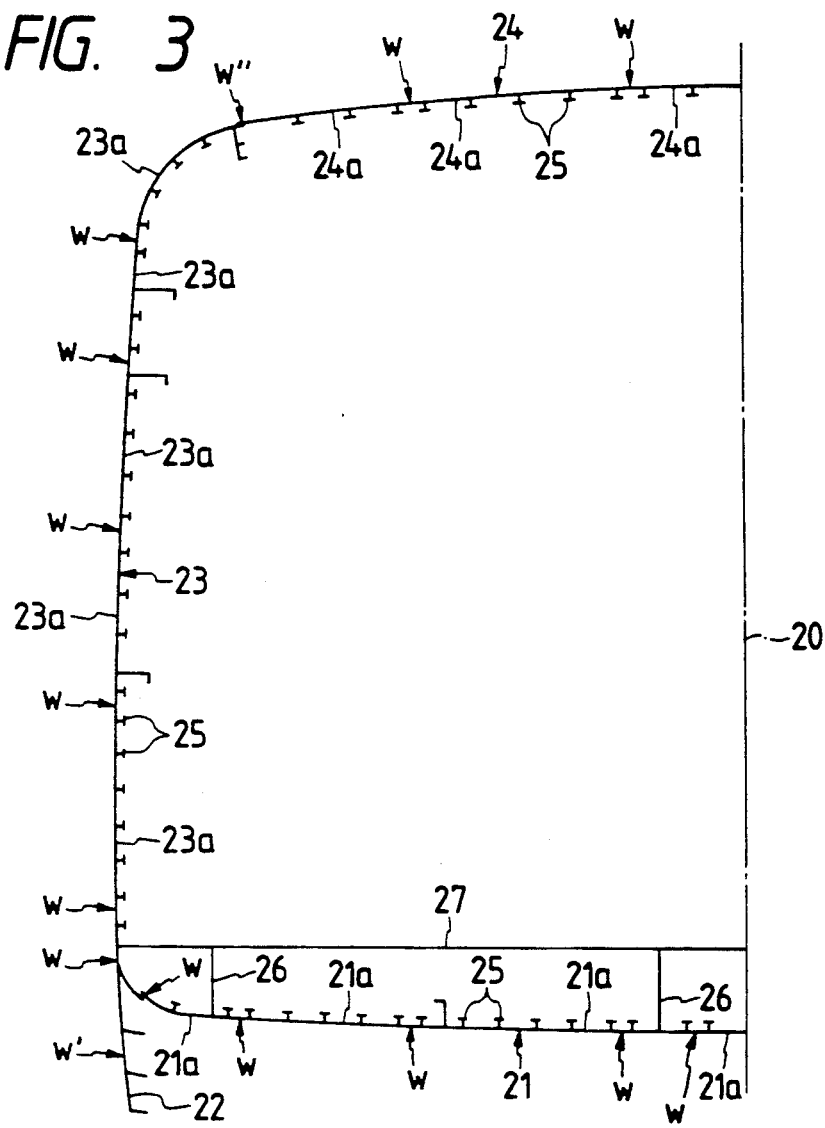
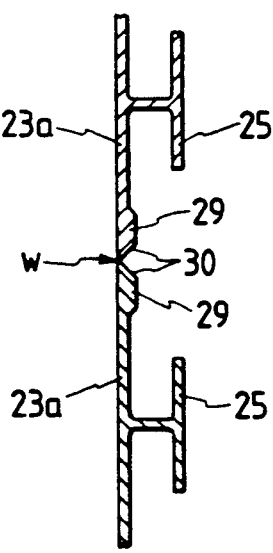

METHOD OF MANUFACTURING A VEHICLE BODY

BACKGROUND OF THE INVENTION

1. Field of the Invention

This invention relates to a vehicle body method of manufacturing vehicle bodies, more particularly, to railway and other track-guided vehicle bodies, including bodies for monorail and mag-lev (magnetic levitation) vehicles.

2. Description of the Prior Art

Conventionally, railway vehicle bodies have been formed of steel, by shaping thin steel plates and welding the plates to provide the sides, roof, floorplate and end of the body. One example of such a process is shown in JP-B-63-12027, in which the body side is formed by first welding together planar sheets previously cut to shape, then bending the side to the desired shape, and then spot welding horizontal and vertical frame members to the sheet side. The frame metals are channels, so that a box structure is produced for each frame member, with the steel used in such a process having a typical thickness of, typically 1.6 mm.

A particular problem which arises with the use of steel in this manner is that the welding of the frame members causes distortion of the thin outer plates, and this distortion must be removed after completion of the structure. A great deal of time and labor is necessary to remove the distortion. The occurrence of the distortion during the production of the structure can be prevented, in principle, by bonding the frame members to the plates while tension is applied to the plates, but an apparatus for applying tension is required and the production process is complicated.

It is also known to form railway vehicle bodies from extruded metal plates having integral ribs on the inside faces with the extruded metal sections or plates being typically formed of a light metal, particularly aluminium or aluminium alloy. An example of a railway vehicle so constructed is described in "Light Metal Railway Vehicle Committee Report No.3", 1978, Japanese Railway Vehicle Industry Association, pages 70-72. This body has sides comprising seven sections welded together along vertical weld lines, with each section being itself formed of a number of elements of different shapes, welded together, and the ends are similarly formed. The roof is partly formed of elongate plates having integral ribs welded together at overlapping edges, with ribs being provided at these edges. The welding is conducted from the outside of the plates and is groove welded with a backing plate integral with one plate, i.e. the plates overlap. Japanese Utility Model Publication No. 57-42128 illustrates a similar construction of a railway vehicle body side.

In these structures formed of extruded plates, the arrangement of the plates for welding is complicated, and automation cannot be achieved. To avoid the occurrence of distortion in the plate surface, the thickness of the plate is increased, increasing the weight of the vehicle, even though the plates are made of light metal.

SUMMARY OF THE INVENTION

One object of the present invention is to provide a method of manufacture of a vehicle body which is simple and can therefore achieve a high level of economy in performance, using extruded metal plates.

It is another object of the present invention to provide a method of manufacturing of a vehicle body which allows a high degree of automation in the welding of the extruded metal plates.

It is yet another object of the invention to provide a method of manufacturing a window or door opening in a vehicle body side in an economical and accurate manner.

According to the invention in one aspect there is provided a method of manufacture of a portion of a vehicle body structure, with the portion being at least part of one of a side, an end, a roof and a floorplate of the body structure, which method comprises the steps of:

(i) providing at least two extruded metal plates each having at least one welding edge and integral structural ribs extending parallel to the at least one welding edge, with the ribs being on the face of the plate which is inner in the assembled body structure, (ii) arranging said plates on a jig in position for welding of at least one pair of the welding edges, without overlap of the welding edges, (iii) restraining the plates in their welding position on the jig, and (iv) welding the welding edges together on the jig by one-side welding from the side of the plates having the ribs, to produce continuous welds at the welding edges.

The method preferably includes the further step after step (iv) of:

(v) welding frame members to the ribs, said frame members extending transversely to the ribs. Particularly advantageously, the frame members are welded to the ribs without removing the vehicle body portion from the jig after step (iv).

Preferably each of the adjacent pairs of welding edges welded together in step (iv) is an edge of a welding portion of the plate projecting laterally from the closest of the structural ribs of the plate.

In the case where the body portion is at least part of a side, a roof or a floorplate of the body structure, the plates may each extend the full length of the body structure. In the case where the body portion is at least part of an end of the body structure, each of the plates may extend the full height of the end.

The invention also provides a method of forming a window or door opening in a vehicle body using such extruded plates, in which the ribs are removed at the location of the opening prior to the welding.

In another aspect, the invention provides a vehicle body having an external body sheeting comprising opposite sides and roof and having an internal floor extending between the sides, wherein, as seen in transverse section of the body, both the sides above the level of the internal floor and said roof each consist of a plurality of extruded metal plates providing the external body sheeting and having integral structural ribs extending longitudinally of the body on the inner faces of the extruded plates, with the plates being welded together at weld lines extending longitudinally of the vehicle body.

The invention is applicable to railway power cars, non-powered cars and locomotives. If the vehicle body is a passenger vehicle body having passenger seating space, the extruded plates preferably extend longitudinally the full length of the passenger seating space.

In yet another aspect, the invention provides a vehicle body having a structural portion which is at least part of one of a side, an end, a roof and floorplate of the body, which structural portion has a plurality of extruded metal plates each having integral structural ribs on its inner side, with the ribs on the plates all being parallel and the plates being welded to each other by continuous welds along weld lines parallel to the ribs, there being no overlap of the plates at the welds.

BRIEF DESCRIPTION OF THE DRAWINGS

Embodiments of the present invention will now be described by way of non limitative example with reference to the accompanying drawings in which:

FIG. 3 is a transverse section of half of a vehicle body which is the second embodiment of the invention;

FIG. 4 is a sectional view illustrating parts of two extruded metal plates in position in readiness for welding, in an embodiment of the method of the invention;

DESCRIPTION OF THE PREFERRED EMBODIMENTS

Figure 1:
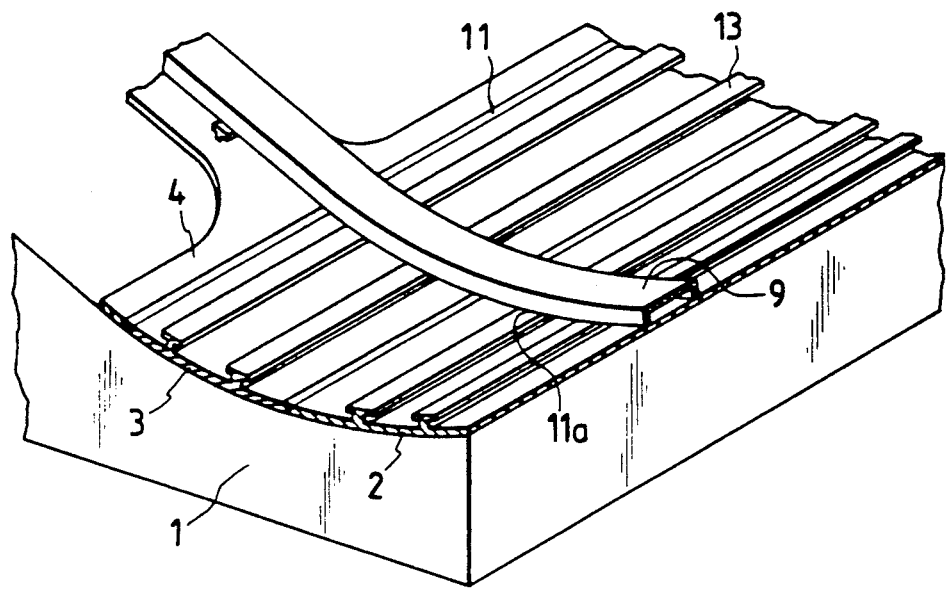
FIG. 1 is a perspective view showing part of a vehicle body portion constructed in accordance with a method embodying the invention.
Figure 2:
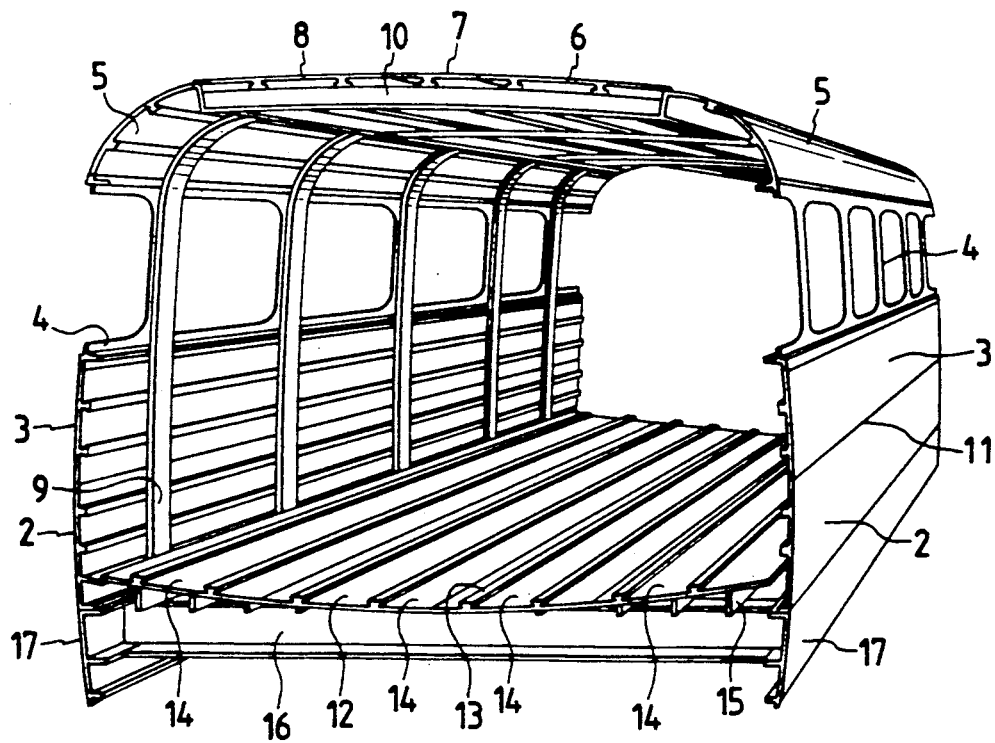
FIG. 2 is a perspective view showing part of a railway vehicle body embodying the invention and including portions produced by the method of FIG. 1.

In FIG. 1, a jig 1 is shaped so that a support surface thereof is coincidental with the desired shape of the outside of the respective one of the side structure, end structure, roof structure and floorplate structure of the railway vehicle body being manufactured. As shown in FIG. 2, extruded metal plates 2, 3, 4 and 5 constitute each side structure and include extrusion molded members aligned in the longitudinal direction of the vehicle body and having structural ribs 13 formed integrally on the inside thereof are shown in FIG. 2. Plates 6, 7 and 8 constitute the roof structure and include extrusion molded members aligned in the longitudinal direction of the car body and have structural ribs formed integrally on their inner faces. Transverse frame members 9 are disposed on the inner faces of the plates 2, 3, 4 and 5 and are welded to the ribs 13. The lower end of each member 9 is bonded to the underframe i.e. to the side sill of the body, as in the lowermost of the side plates on each side. Transverse frame members 10 are disposed on the inner face of the roof plates 6, 7 and 8 welded to the ribs 13. All of the plates 2-8 have, on opposite sides thereof, welding edges parallel to the ribs 13. The plates are made by a conventional technique from aluminium or aluminium alloy and may be as long as 25 m and as wide as 60 cm.

The assembly of the side and roof described above will be explained for the case of one side by way of example. First the plates 2, 3, 4 and 5 constituting the side are aligned for welding side-by-side on the jig 1 whose support surface is in agreement with the desired surface shape of the side, and the plates are restrained, e.g. clamped, in this position. The plates 2, 3, 4 and 5 are welded in this clamped state by forming continuous weld lines 11 at their adjoining welding edges. Welding of each weld line 11 of the plates 2, 3, 4 and 5 is carried out in such a manner that the welding edge of each outer plate is completely fused. The welding is one-side welding conducted from the inside, i.e. the side of the ribs 13. The welding edges of the plates are not overlapped during welding. In other words, welding is done in such a manner that a bead comes out on the outside in the welding direction and is later finished smooth by surface treatment. In this manner unwelded portions and blow-holes can be checked. The parallel weld lines between the plates 2 and 3, between the plates 3 and 4 and between the plates 4 and 5 may be welded simultaneously with one another. After this welding work is completed, each frame member 9 is placed at its welding position on the plates 2, 3, 4 and 5. The plates 2, 3, 4 and 5 and the frame members 9 are clamped and the ribs 13 of the plates 2, 3, 4 and 5 and the members 9 are welded at the weld lines 11a.

In this production method, the weld lines of the plates 2, 3, 4 and 5 extend parallel to the longitudinal direction of the vehicle body. Consequently, the welding operations can be automated and the working efficiency can be improved.

Since mutual welding of the plates 2, 3, 4 and 5 and welding of the plates 2, 3, 4 and 5 and the frame members 9 can be carried out on the same jig without moving the plates and since the welding operations can all be conducted from one side, working efficiency can be improved considerably. Since the plates 2, 3, 4 and 5 are not moved after first being located on the jig, the disadvantage of deformation due to such movement does not arise.

The assembly work described above is also carried out for the roof in the same way.

A window opening in the side structure is defined by cutting out the portion of the plate 4 corresponding to the window opening. A described below with reference to FIGS. 5 to 8, first, the ribs 13 at the regions of the plate 4 corresponding to the edge of each window opening are removed to a predetermined width. The cut-away length of the ribs 13 takes into consideration the width of window glass and the window frame and the dimensional tolerance in machining of the window opening, around the window opening. Slots are formed interruptedly along the shape of the window opening after the removal of the portions of the ribs 13. Then, the plate 4 is welded to the other plates 3 and 5 as described. When the side is completed by welding of the frame members 9, the unnecessary window portions are completely removed along the slots of the window openings. The length of each slot is determined by consideration of strength so that the plate 4 can withstand deformation resulting from welding heat at the time of welding of the frame member 9 and when the plate 4 is welded to the other plates. Machining of the window opening portion may be carried out after the whole structure is completed.

Working efficiency can thus be improved by pre-cutting the ribs 13 at the edge of the window opening and forming the slots prior to welding.

However, removal and machining of the window opening on the side may be executed without first forming the slots.

As described above, if the ribs 13 at the window portions of the plate 4 corresponding to the edge of the window opening portion are removed, the members constituting the window such as window glass and frame can be easily disposed. Furthermore, a seal around the window can also be easily made, too.

As shown in FIG. 2, a floorplate 12 of arcuate shape is located on the underframe of the body. The floorplate 12 also includes several extrusion molded metal plates 14 which have integral structural ribs 13 parallel to the longitudinal direction of the body on their upper faces and flanges 15 for fixing to the underframe on their lower faces. These lower flanges 15 need not be formed as part of the floorplate but instead supports can be arranged on the cross-beams of the underframe.

When this floorplate 12 is welded, the support surface of the jig has a curved shape and recesses are formed at the positions corresponding to the ribs 13. The plates 14 are placed on the jig with the ribs 13 facing downwardly and are clamped. The welding operations are thereafter carried out from one side as already described. The cross-beams 16 and side sills of the underframe are then clamped on the floorplate, and welded. If the underframe is made in this manner, it can be produced on the same jig by welding from one direction only. Accordingly, working efficiency can be improved.

Instead of construction of the underframe as described above, the jig can be simplified by preforming a floorplate support surface at the top of the cross-beams, assembling the cross-beams and the side sills on the jig, utilizing the upper surface of the cross-beams as the jig for the floorplate and joining the extruded plates 14 to one another on the cross-beams to make the floorplate.

Alternatively, the floorplate 12 can be assembled by welding the plates 14 together in the same way as the side, as shown in FIG. 1, but in the case of the floorplate 12, transverse frame members are not welded to the ribs.

If the sectional shape of one of the extruded plates for the vehicle body has a curved surface, the plate also easily shaped during extrusion with the curved surface and the support surface of the jig, is formed to match the curved surface. When the plates are welded on this jig, welding can be effected while the curvatures of the plates correspond to one another with high accuracy. Accordingly, the outer surface of the body structure can be formed accurately and, when the plates are welded to the frame members on the same jig, welding to the frame members can be achieved while maintaining this accuracy.

FIG. 3 shows the a left-hand half of the section of another railway passenger vehicle body of the present invention from the vertical center line 20. FIG. 3 shows part of the floorplate 21 of the body, one of the side sills 22, one of the body sides 23 and part of the roof 24. Each of the floorplate 21, the sides 23 and the roof 24 are constructed of a plurality of elongate extruded metal plates 21a, 23a and 24a, welded together by one-side welding in accordance with the present invention as described above, at welding points indicated by the arrows w. The welding point of the extruded elements making up the side sill 22 is indicated by arrows w' and an overlap weld indicated by arrow w" is formed from the extruded members at the junction of the side 23 and the roof 24.

Each of the extruded metal plates 21a, 23a, 24a has at least two reinforcing structural ribs 25 at its inner face. The ribs all extend parallel to the longitudinal direction of the body and to the weld lines at which the plates are welded.

The floorplate 21 has integrally formed tall ribs or flanges 26 which, in the finished vehicle body, support the internal floorboard. This internal floor level is indicated by line 27. It can be seen from FIG. 3 that the whole of the outer sheeting of the vehicle body above the floor line 27 is composed of extruded metal members having integrally formed internal ribs, welded to each other. These welds are all welds as described below with reference to FIG. 4, except at the overlap weld w" where the body side joins the roof. The passenger seating space is of course bounded by the side 23, the roof 24 and the internal floor line 27. Each of the extruded plates 21a, 23a and 24a extends the full length of the passenger seating space. The ribs 25 and the weld lines w, w" are all parallel to each other and extend longitudinally of the vehicle body. As in the embodiment of FIG. 2, transverse frame members, not shown in FIG. 3, are welded to the ribs 25 on the inside of the extruded plates.

Referring now to FIG. 4 depicting the weld region of two of the extruded metal plates 23a of the side 23 of the vehicle body of FIG. 3, showing in each case one of the ribs 25. The welding point is indicated by arrow w and the welding takes place from the inside, i.e. the rib side, of the plates 23a. The welding edges of the plates 23a have thick regions 29 spaced from the nearest rib 25 in each case and ending at bevel faces 30 which thus provide a V-shape grove opening towards the inside, i.e. the welding side. The thickening 29 is towards the inside, so that the outside remains smooth. To give examples of dimensions, the nominal thickness, i.e. general thickness of the continuous sheet of the plate 23a is 2.3 mm, and the thickness of the thickened portions 29 is 4 mm. The width of the portions 29 is about 10 mm. The height of the ribs, from their inside face to the outer face of the plate is 15 mm.

The thickenings 29 are to be regarded as nonstructural, since they do not significantly contribute to the strength of the body. In contrast the ribs 13, 25 are of a size and shape to provide essential reinforcement of the body structure.

The weld of FIG. 4 is the single V type, which is one example of the one-side groove welding which may be used in the present invention. Other types of oneside groove weldings which may be used are square, single bevel, single U and single J.

Figure 5:
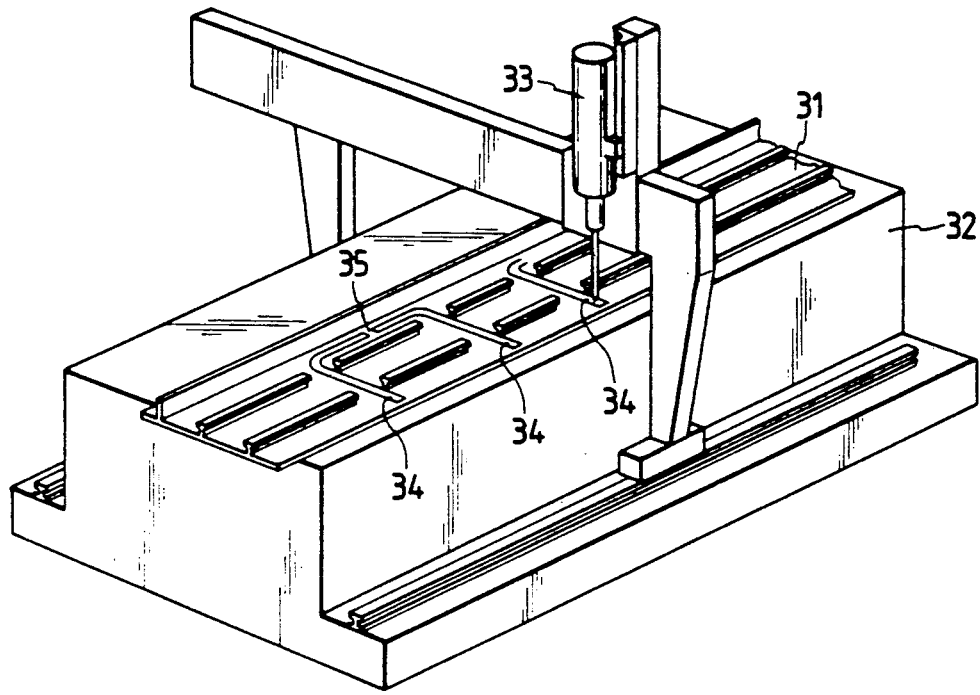
FIG. 5 illustrates a slotting machine and an extruded plate used in a method embodying the invention.

FIG. 5 shows a first stage in the formation of a window opening in a railway vehicle body such as is shown in FIGS. 1-3. Each window opening is in this case formed by cutting out portions of two of the extruded metal plates. One of these plates is shown at 31 in FIG. 5, on the bed 32 of a slotting machine. The slotting machine head 33 cuts slots 34 in the plate 31 at locations corresponding to the window openings. Bridges 35 are left between the slots 34.

Prior to the cutting of the slots 34, portions of the ribs of the plate have been removed by grinding over lengths which are longer than the width of the slots 34, so that areas of the plate are provided which are free of ribs, adjacent the location of the window opening.

Figure 6:
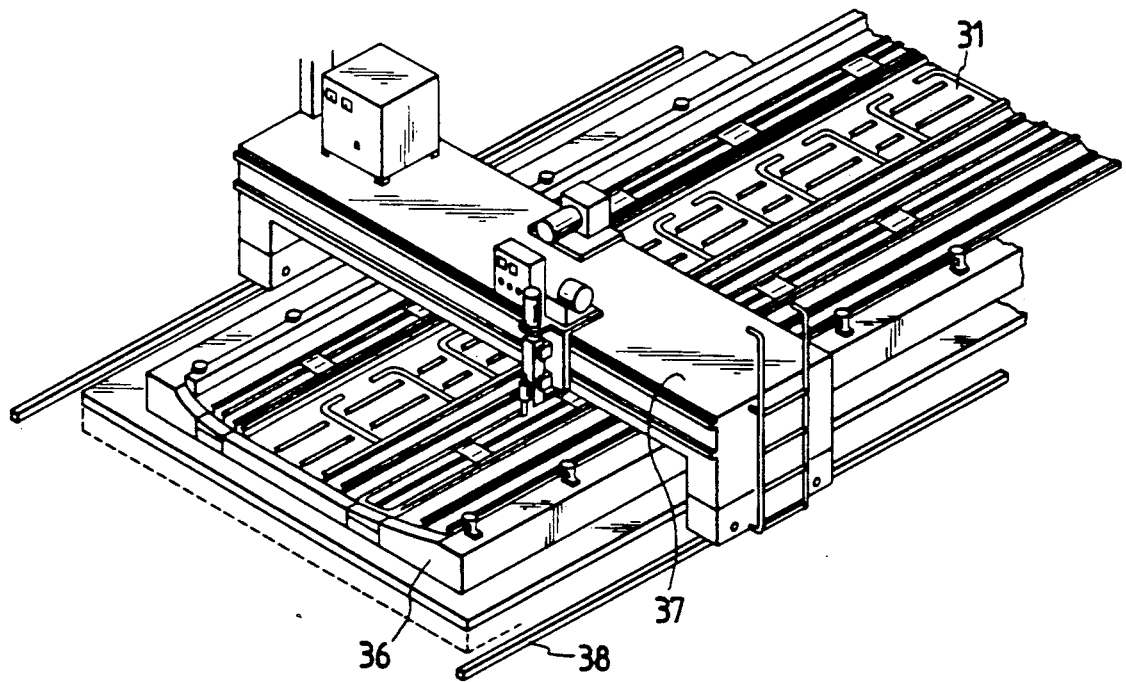
FIG. 6 shows a welding machine performing a welding operation on extruded plates in a method embodying the invention.

FIG. 6 shows a plurality of plates forming part of the side of the railway vehicle assembled in place on a jig 36, which is bridged by an automatic welding machine 37 running on rails 38 parallel to the longitudinal direction of the extruded plates. The plates include the slotted plate 31 shown in FIG. 5 and another plate which, in like manner, has been prepared at the location of the remainder of the window opening. The longitudinal welding together of the plates in the manner already described is conducted by traversing the welding heads of the welding bridge 37. Only one welding head is shown, but in practice a plurality of longitudinal welds may be formed simultaneously using a plurality of heads.

Figure 7:
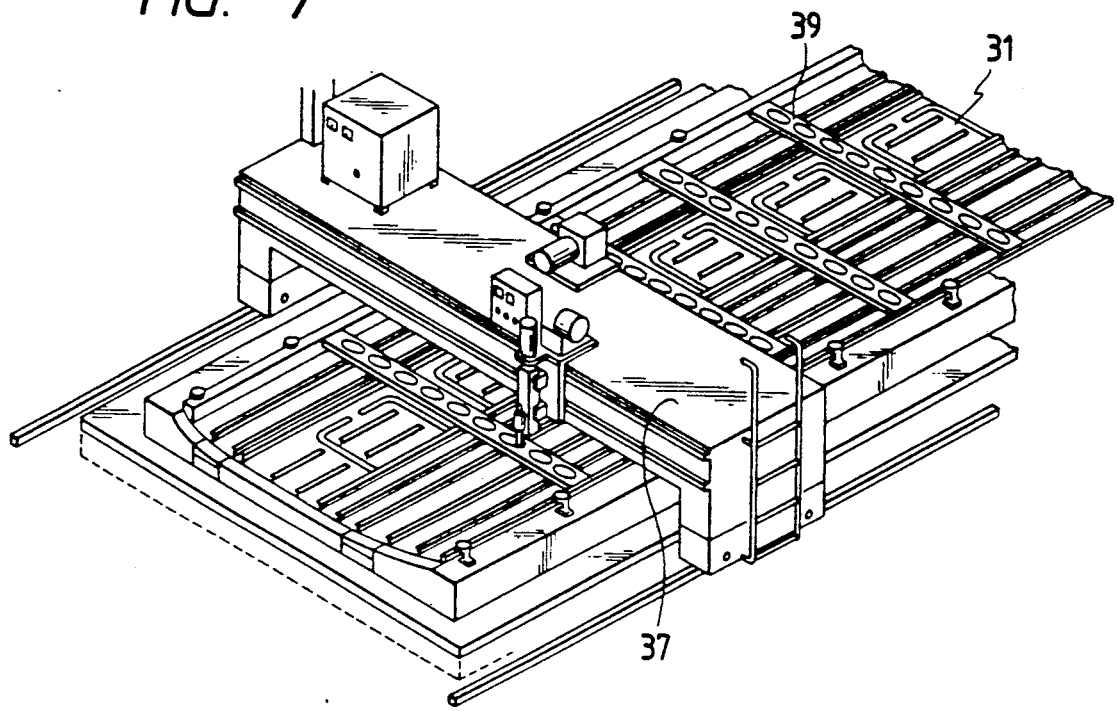
FIG. 7 shows the welding machine of FIG. 6 and the extruded metal plates at a later stage in the method.
Figure 8:
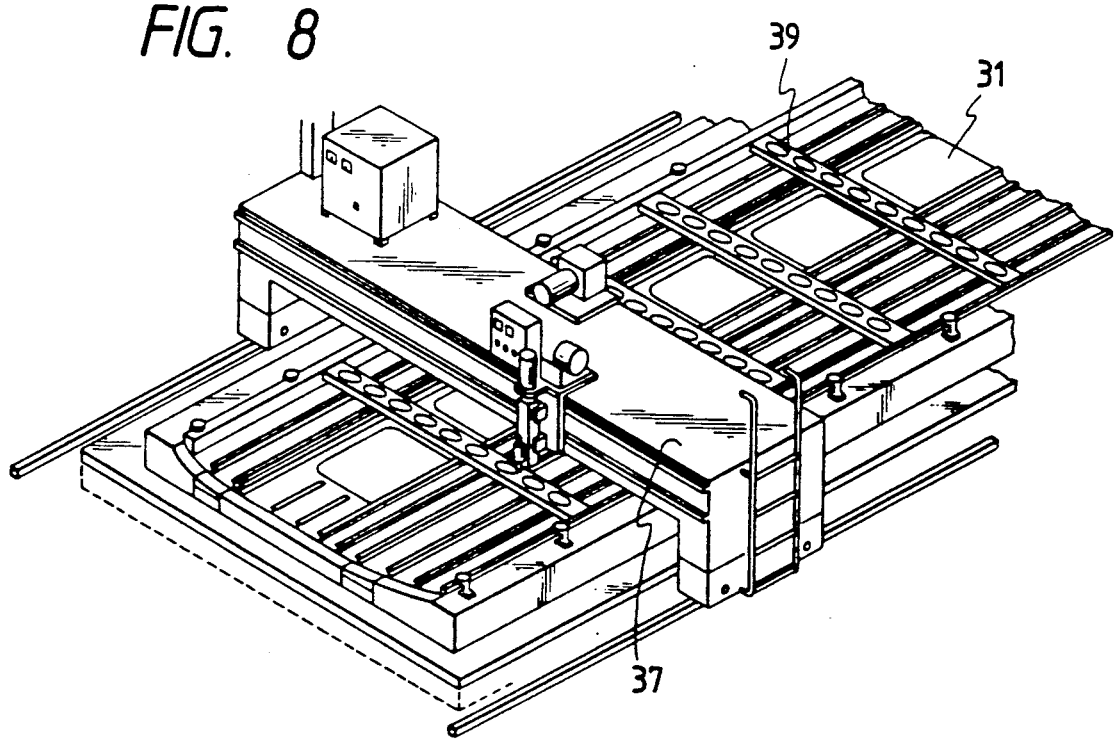
FIG. 8 shows the method of FIGS. 6 and 7 at a later stage.

FIG. 7 shows the transverse frame members 39 in place on the welded together extruded plates and being welded to the ribs of the plates by the welding bridge 37. At this stage, the portions of the plates remaining within the slots 34 are still present. FIG. 8 shows that these portions have been removed, following the welding of the transverse frame members 39. The body side is then ready for finishing of the window openings.

What we claim is:

1. A method of manufacturing a portion of a vehicle body structure, said portion being at least a part of one of a side, an end, a roof, and a floor plate of the body structure, the method comprising the steps:
   (i) providing at least two extruded metal plates formed of a light alloy metal, each of said plates having at least one welding edge and integral structural ribs extending parallel to said at least one welding edge, said integral structural ribs being on an inner face of said plate in the assembled body structure,
   (ii) arranging said plates on a jig in position for welding of at least one pair of said welding edges, without overlap of said welding edges,
   (iii) restraining said plates in their welding position on said jig,
   (iv) welding said welding edges together on said jig by one-sided welding from the side of said plates having said integral structural ribs, to produce continuous welds at said welding edges, thereby completely fusing said welding edges of said plates, and
   (v) welding frame members to said integral structural ribs without removing the vehicle body portion from said jig after executing the step of welding said welding edges together on said jig.

2. A method according to claim 1, wherein said frame members extend transversely to said integral structural ribs.

3. A method according to claim 1 wherein each of the adjacent pairs of welding edges welded together in step (iv) is an edge of a welding portion of the plate projecting laterally from the closest of said structural ribs of the plate.

4. A method according to claim 1 wherein the welding of step (iv) is conducted so that welding bead appears at the opposite side of the plates from the side at which the one-side welding is performed.

5. A method according to claim 1 wherein said welding of step (iv) is performed at portions of said plates having non-structural thickening to provide greater thickness than the general thickness of the plates.

6. A method according to claim 1 wherein each of the pairs of welding edges welded together in step (iv) are bevel edges presenting a V-shape open towards the side from which welding is effected.

7. A method according to claim 1 including the further step of removing welding bead formed at the opposite side of the plates from the side from which welding is conducted.

8. A method according to claim 1 wherein said portion is at least part of a side, a roof or a floorplate of the body structure and said plates each extend the full length of the body structure.

9. A method according to claim 1 wherein said portion is at least part of an end of said body structure and each of said plates extends the full height of the end.

10. A method according to claim 1 wherein said vehicle body structure is a body structure for a railway passenger vehicle.

11. Method of manufacture of a portion of a vehicle body structure, said portion being at least part of one of a side and an end of said body structure and including at least one opening selected from a window opening and a door opening, which method comprises the steps of:
   (i) providing at least two extruded metal plates each having at least one welding edge and integral structural ribs extending parallel to said at least one welding edge, said ribs being on an inner face of the plate in the assembled body structure,
   (ii) removing said ribs at a region of at least one of said plates, which region includes the location in the finished structure of the edge of said opening,
   (iii) welding said plates together at at least one pair of said welding edges after step (ii).

12. Method according to claim 11 including, prior to welding said plates together, cutting a plurality of slots in at least one of said plates at said region corresponding to the edge of said opening so as to define a panel corresponding to at least part of said opening, and removing said panel after said welding of the plates.

* * * * *